(12) United States Patent
Graley et al.

(10) Patent No.: US 10,011,922 B2
(45) Date of Patent: Jul. 3, 2018

(54) CORE-SHELL MORPHOLOGY OF COMPOSITE FILAMENTS FOR USE IN EXTRUSION-BASED ADDITIVE MANUFACTURING SYSTEMS

(71) Applicant: Stratasys, Inc., Eden Prairie, MN (US)

(72) Inventors: Christopher Scott Graley, Glencoe, MN (US); Christine Lawrence Sumerel, Brecksville, OH (US); James E. Orrock, Eden Prairie, MN (US)

(73) Assignee: Stratasys, Inc., Eden Prarie, MN (US)

( * ) Notice: Subject to any disclaimer, the term of this patent is extended or adjusted under 35 U.S.C. 154(b) by 205 days.

(21) Appl. No.: 15/075,522

(22) Filed: Mar. 21, 2016

(65) Prior Publication Data
US 2017/0268133 A1     Sep. 21, 2017

(51) Int. Cl.
  *D01F 8/10*      (2006.01)
  *B33Y 70/00*     (2015.01)
  *B33Y 80/00*     (2015.01)
  *B29L 9/00*      (2006.01)
  *B29K 33/00*     (2006.01)
  *B29K 505/12*    (2006.01)
  *B29C 47/04*     (2006.01)
  *B29C 47/00*     (2006.01)
  *B29C 47/02*     (2006.01)

(52) U.S. Cl.
  CPC ............ *D01F 8/10* (2013.01); *B29C 47/0019* (2013.01); *B29C 47/0064* (2013.01); *B29C 47/025* (2013.01); *B29C 47/04* (2013.01); *B29K 2033/08* (2013.01); *B29K 2505/12* (2013.01); *B29L 2009/00* (2013.01); *B33Y 70/00* (2014.12); *B33Y 80/00* (2014.12); *Y10T 428/2913* (2015.01); *Y10T 428/2927* (2015.01); *Y10T 428/2929* (2015.01); *Y10T 428/2938* (2015.01); *Y10T 428/2967* (2015.01)

(58) Field of Classification Search
CPC ... B29C 47/025; B29C 47/04; B29C 47/0019; B29C 47/0064; Y10T 428/2913; Y10T 428/2927; Y10T 428/2929; Y10T 428/2938; Y10T 428/2967
See application file for complete search history.

(56) References Cited

U.S. PATENT DOCUMENTS

| 5,503,785 A | 4/1996 | Crump et al. |
| 5,866,058 A | 2/1999 | Batchelder et al. |
| 6,004,124 A | 12/1999 | Swanson et al. |
| 6,923,634 B2 | 8/2005 | Swanson et al. |
| 7,122,246 B2 | 10/2006 | Comb et al. |

(Continued)

*Primary Examiner* — Betelhem Shewareged
(74) *Attorney, Agent, or Firm* — Peter J. Ims; Westman, Champlin & Koehler, P.A.

(57) ABSTRACT

A consumable filament for use in an extrusion-based additive manufacturing system, where the consumable filament comprises a core portion of a matrix of a first base polymer and particles dispersed within the matrix, and a shell portion comprising a same or a different base polymer. The consumable filament is configured to be melted and extruded to form roads of a plurality of solidified layers of a three-dimensional part, and where the roads at least partially retain cross-sectional profiles corresponding to the core portion and the shell portion of the consumable filament and retain the particles within the roads of the printed part and do not penetrate the outer surface of the shell portion.

20 Claims, 7 Drawing Sheets

(56) References Cited

U.S. PATENT DOCUMENTS

| | | | |
|---|---|---|---|
| 7,384,255 B2 | 6/2008 | LaBossiere et al. | |
| 7,491,356 B2 | 2/2009 | Heikkila | |
| 7,604,470 B2 | 10/2009 | LaBossiere et al. | |
| 7,625,200 B2 | 12/2009 | Leavitt | |
| 2009/0274540 A1 | 11/2009 | Batchelder et al. | |
| 2010/0096485 A1 | 4/2010 | Taatjes et al. | |
| 2010/0096489 A1 | 4/2010 | Taatjes et al. | |
| 2012/0231225 A1* | 9/2012 | Mikulak | B29C 47/025 428/172 |
| 2013/0252497 A1* | 9/2013 | Schiebel | B29B 11/16 442/181 |
| 2016/0024293 A1 | 1/2016 | Nestle et al. | |
| 2017/0268133 A1* | 9/2017 | Graley | D01F 8/10 |

* cited by examiner

CORE-SHELL MORPHOLOGY OF COMPOSITE FILAMENTS FOR USE IN EXTRUSION-BASED ADDITIVE MANUFACTURING SYSTEMS

BACKGROUND

The present disclosure relates to additive manufacturing systems for printing three-dimensional (3D) parts and support structures. In particular, the present disclosure relates to materials for use in additive manufacturing systems, consumable assemblies retaining the materials, and methods of manufacturing and using the materials and assemblies in additive manufacturing systems to print 3D parts. All references disclosed herein are incorporated by reference.

Additive manufacturing systems are used to build 3D parts from digital representations of the 3D parts (e.g., STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the modeling material during fabrication, and is removable from the completed 3D part when the printing process is complete.

SUMMARY

In a first aspect, the present disclosure is directed to a consumable filament for use in an extrusion-based additive manufacturing system. The consumable filament includes a core portion extending along a longitudinal length of the consumable filament, the core portion compositionally comprising a matrix of a first base polymer and particles dispersed within the matrix and a shell portion extending along the longitudinal length of the consumable filament and at least partially encasing the core portion, the shell portion compositionally comprising a second base polymer, wherein the consumable filament is configured to be melted and extruded in an additive manufacturing system. The first base polymer and the second base polymer may be the same. The first base polymer and the second base polymer may be different. The particles in the core portion may be selected from metallic particles, non-metallic particles, magnetic particles and combinations thereof. The particles may be ferrite particles. The particles may be at least about 50 percent by volume of the core portion volume. The consumable filament may have a geometry selected from a cylinder, a ribbon, a tube and other filled or hollow profiles. The shell portion may be acrylonitrile styrene acrylate (ASA) and the core portion may be a matrix of ASA and ferrite particles.

In another aspect, the present disclosure is directed to a printed part built with an extrusion-based additive manufacturing system. The printed part includes a plurality of solidified layers each comprising roads extruded with the extrusion-based additive manufacturing system from a consumable filament having a core portion and a shell portion, wherein the core portion compositionally comprises a matrix of a first base polymer and particles dispersed within the matrix, and wherein the shell portion comprises a second base polymer; and wherein the plurality of solidified layers retain the particles substantially within the core portion of the consumable filament and at least partially retain the cross-sectional profiles corresponding to the core portion and the shell portion of the consumable filament. The first base polymer and the second base polymer may be the same. The first base polymer and the second base polymer may be different. The particles in the core portion may be selected from metallic particles, non-metallic particles, magnetic particles and combinations thereof. The particles may be ferrite particles. The particles may be at least about 50 percent by volume of the core portion volume. The shell portion may be ASA and the core portion may be a matrix of ASA and ferrite particles.

In a further aspect, the present disclosure is directed to a method for building a three-dimensional part with an additive manufacturing system having an extrusion head. The method includes providing a consumable filament to the extrusion head, the consumable filament comprising a core portion and a shell portion substantially encasing the core portion, wherein the core portion compositionally comprises a matrix of a first base polymer and particles dispersed within the matrix, and wherein the second portion compositionally comprises a second base polymer. The printing step may include melting the fed consumable filament in the extrusion head to form a molten material, depositing the molten material in a build environment as extruded roads that defines a layer of the three-dimensional object and solidifying the extruded roads, wherein the solidified roads at least partially retain cross-sectional profiles corresponding to the core portion and the shell portion of the consumable filament and retain the particles within the extruded roads. The first base polymer and the second base polymer may be the same. The first base polymer and the second base polymer may be different. The particles in the core portion may be selected from metallic particles, non-metallic particles, magnetic particles and combinations thereof. The particles may be ferrite particles. The particles may be at least about 50 percent by volume of the core portion volume. The shell portion may be Acrylonitrile Styrene Acrylate (ASA) and the core portion may be ASA-ferrite.

In yet a further aspect, the present disclosure is directed to a method of making a consumable filament for use in an additive manufacturing system. The method includes extruding a consumable filament for use in an additive manufacturing system, the consumable filament comprising a core portion and a shell portion that substantially encases the core portion, wherein the core portion and the shell portion are coextruded, the core portion compositionally comprising a matrix of a first base polymer and particles dispersed within the matrix and the second portion compositionally comprising a second base polymer. The extrusion of the core portion may use a lead screw extruder. The extrusion of the shell portion may use a pressure limited extruder. The ratio of the core portion volume to the shell portion volume can be varied by increasing the speed of core portion extrusion. The core portion can be between about 50 percent by volume and about 95 percent by volume of the consumable filament. The particles may be selected from metallic particles, non-metallic particles, magnetic particles and combinations thereof.

DEFINITIONS

Unless otherwise specified, the following terms used in this specification have the meanings provided below.

The term "polymer" refers to a polymeric material having one or more monomer species, including homopolymers, copolymers, terpolymers, and the like.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one polyamide", "one or more polyamides", and "polyamide(s)" may be used interchangeably and have the same meaning.

The term "three-dimensional part" refers to any part built using a layer-based additive manufacturing technique, and includes 3D parts and support structures built using layer-based additive manufacturing techniques.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

Unless otherwise specified, characteristics of a material or a 3D part printed from the material refer to the characteristics as measured parallel to the orientation of the 3D part layers and perpendicular to the layer-printing direction, and is referred to as a "xy-direction". Correspondingly, the term "z-direction", with reference to characteristics of a material or a 3D part printed from the material refer to the characteristics as measured perpendicular to the orientation of the 3D part layers and parallel to the layer-printing direction. Unless the measurement direction is specified as "in the z-direction", a measurement referred to herein is taken in the xy-direction. For example, a tensile strength of a 3D part of 10,000 psi refers to a tensile strength measured parallel to the layers of the 3D part. Alternatively, a tensile strength of a 3D part in the z-direction of 8,000 psi refers to a tensile strength measured perpendicular to the layers of the 3D part.

Unless otherwise specified, temperatures referred to herein are based on atmospheric pressure (i.e. one atmosphere).

The term "additive manufacturing system" refers to a system that prints, builds, or otherwise produces 3D parts and/or support structures at least in part using an additive manufacturing technique. The additive manufacturing system may be a stand-alone unit, a sub-unit of a larger system or production line, and/or may include other non-additive manufacturing features, such as subtractive-manufacturing features, pick-and-place features, two-dimensional printing features, and the like.

The term "providing", such as for "providing a consumable material", when recited in the claims, is not intended to require any particular delivery or receipt of the provided part. Rather, the term "providing" is merely used to recite parts that will be referred to in subsequent elements of the claim(s), for purposes of clarity and ease of readability.

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

The terms "about" and "substantially" are used herein with respect to measurable values and ranges due to expected variations known to those skilled in the art (e.g., limitations and variabilities in measurements).

The terms "core portion" and "shell portion" of a filament refer to relative locations of the portions along a cross-section of the filament that is orthogonal to a longitudinal length of the filament, where the core portion is an inner portion relative to the shell portion. Unless otherwise stated, these terms are not intended to imply any further limitations on the cross-sectional characteristics of the portions.

DETAILED DESCRIPTION

Figure 1:
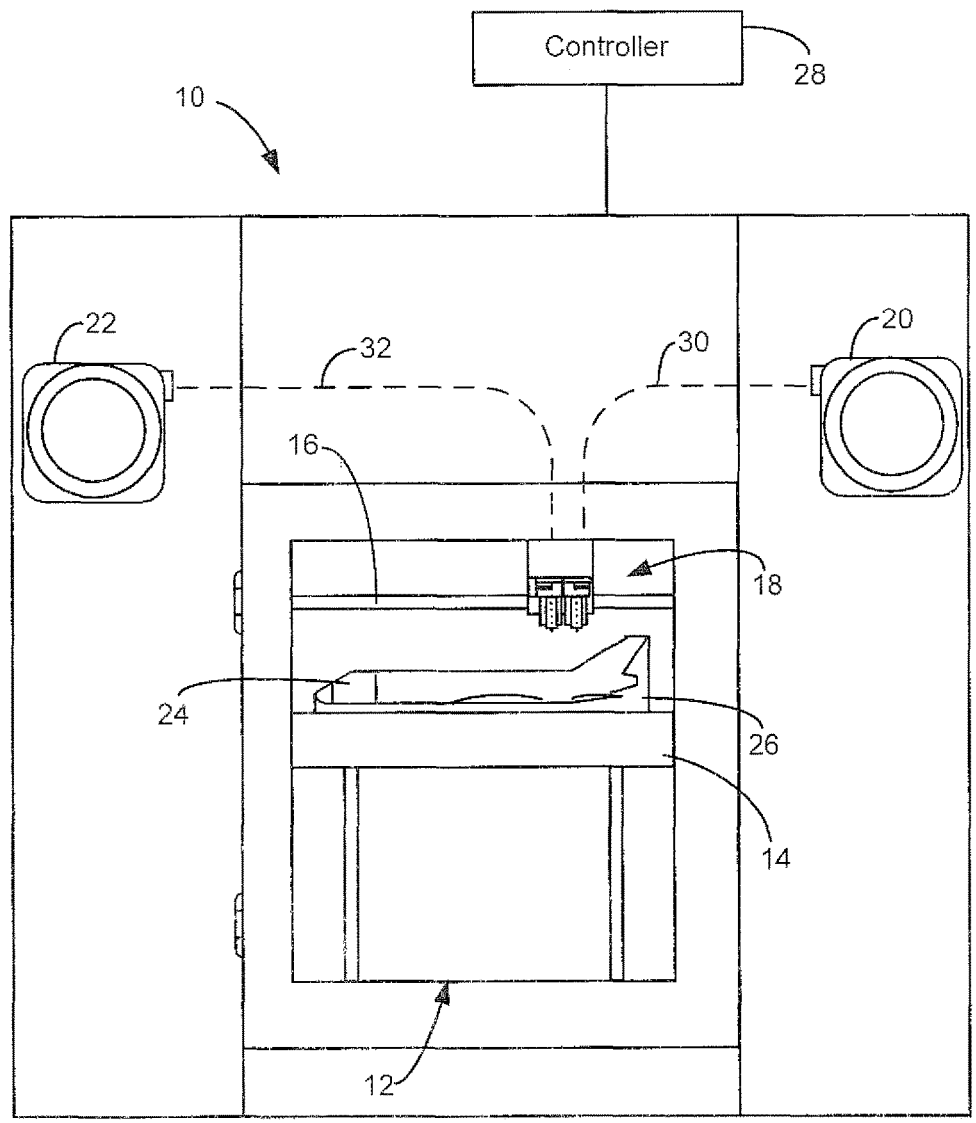
FIG. 1 is a front view of an extrusion-based additive manufacturing system for building printed parts with the use of consumable materials of the present disclosure.

The present disclosure is directed to consumable materials, e.g. consumable composite filaments, for use in extrusion-based additive manufacturing systems, where the consumable materials have core-shell configurations. The core-shell configurations include a core portion and a shell portion where the core portion and the shell portion compositionally include base polymers. The base polymers of the core portion and the shell portion may be the same or different. The core portion can further include particles dispersed within the polymeric matrix of the core portion. These particles can be metallic particles such as ferrite particles. Composite filaments having these compositions impart different properties that can be used to produce printed parts, such as ferromagnetic parts. As discussed below, the different properties of these materials may assist with the build operations in the extrusion-based additive manufacturing systems and may also increase the capability to print parts with different physical properties.

Consumable materials of the present description include a core portion that can compositionally include a matrix of a first base polymer and a shell portion that can compositionally include a same or a different base polymer. The core portion can further include particles, such as metallic particles, dispersed in the polymeric matrix. As discussed further below, consumable filaments where the particles are retained within the core portion desirably have fewer filament breaks during printing, reduced degradation of the extrusion nozzle performance in the additive manufacturing systems and other wear issues on the machinery related to the presence of particles in the consumable materials without the shell layer. The resulting printed parts may accordingly be built with good dimensional accuracies and with good interlayer z-bond strengths while imparting mechanical properties that otherwise could not be previously printed due to the brittle properties of the core matrix.

Extrusion-based additive manufacturing systems currently build printed parts with consumable materials that include a variety of thermoplastic polymeric materials. The thermoplastic polymeric materials can be amorphous or semi-crystalline polymeric materials, such as, but not limited to, acrylonitrile-butadiene-styrene (ABS) resins, ASA resins and polycarbonate resins. Amorphous polymeric materials have little or no ordered arrangements of their polymer chains in their solid states. As such, these materials exhibit glass transition effects that render them suitable for building printed parts and support structures in extrusion-based additive manufacturing systems. For example, as disclosed in Batchelder, U.S. Pat. No. 5,866,058, an amorphous polymeric material may be deposited into a build region maintained at a temperature that is between a solidification temperature and a glass transition temperature of the material. This reduces the effects of curling and plastic deformation in the resulting printed part or support structure. Semi-crystalline materials or materials having both amorphous and semi-crystalline materials can also be used.

As shown in FIG. 1, system 10 is an extrusion-based additive manufacturing system for building printed part with a composite filament disclosed herein. As such, the resulting printed parts may be built with the polymeric materials and particles, while exhibiting reduced brittleness characteristic of composite filaments being fed to the extrusion head due to the shell substantially encasing the core. Examples of suitable systems for system 10 include extrusion-based additive manufacturing systems, such as those commercially available from Stratasys, Inc., Eden Prairie, Minn. under the trade designation "FDM".

System 10 includes build chamber 12, build substrate 14, gantry 16, extrusion head 18, and supply sources 20 and 22. Build chamber 12 is an enclosed, heatable environment that contains build substrate 14, gantry 16, and extrusion head 18 for building a printed part (referred to as printed part 24) and a corresponding support structure (referred to as support structure 26). However, other build environments are also contemplated, such as, but not limited to non-heated build chambers or out of oven build environments. Build substrate 14 can be a platform on which printed part 24 and support structure 26 are built, and desirably moves along a vertical z-axis based on signals provided from computer-operated controller 28. Build substrate 14 may also include a polymeric film (not shown) to further facilitate the removal of printed part 24 and support structure 26. Alternatively, printed part 24 and support structure 26 may be built on a build tray. The build tray may include a polymeric film to facilitate the removal of the printed part and the support structure.

Gantry 16 is a guide rail system that is desirably configured to move extrusion head 18 in a horizontal x-y plane within build chamber 12 based on signals provided from controller 28. The horizontal x-y plane is a plane defined by an x-axis and a y-axis (not shown), where the x-axis, the y-axis, and the z-axis are orthogonal to each other. In an alternative embodiment, build substrate 14 may be configured to move in the horizontal x-y plane within build chamber 12, and extrusion head 18 may be configured to move along the z-axis. Other similar arrangements may also be used such that one or both of build substrate 14 and extrusion head 18 are moveable relative to each other.

Extrusion head 18 is supported by gantry 16 for building printed part 24 and support structure 26 on build substrate 14 in a layer-by-layer manner, based on signals provided from controller 28. In the embodiment shown in FIG. 1, extrusion head 18 is a dual-tip extrusion head configured to deposit materials from supply source 20 and supply source 22, respectively. Examples of suitable extrusion heads for extrusion head 18 include those disclosed in Crump et al., U.S. Pat. No. 5,503,785; Swanson et al., U.S. Pat. No. 6,004,124; LaBossiere, et al., U.S. Pat. No. 7,604,470; and Leavitt, U.S. Pat. No. 7,625,200. Furthermore, system 10 may include a plurality of extrusion heads 18 for depositing modeling and/or support materials.

The composite filaments of the present disclosure may be used as the modeling material for building printed part 24. As such, the composite filament may be supplied to extrusion head 18 from supply source 20 via feed line 30, thereby allowing extrusion head 18 to melt and deposit the composite polymeric materials as a series of extruded roads to build printed part 24 in a layer-by-layer manner. Correspondingly, the support material may be supplied to extrusion head 18 from supply source 22 via feed line 32, thereby allowing extrusion head 18 to melt and deposit the support material as a series of extruded roads to build support structure 26 in a layer-by-layer manner. Suitable devices for supply sources 20 and 22 include those disclosed in Swanson et al., U.S. Pat. No. 6,923,634; Comb et al., U.S. Pat. No. 7,122,246; and Taatjes et al, U.S. Pat. Nos. 7,938,351 and 7,938,356. In one embodiment, the support material used to build support structure 26 may be an amorphous polymeric material, such as the water-soluble and break-away support materials commercially available from Stratasys, Inc., Eden Prairie, Minn.

During a build operation, gantry 16 moves extrusion head 18 around in the horizontal x-y plane within build chamber 12, and one or more drive mechanisms are directed to intermittently feed the modeling and support materials through extrusion head 18 from supply sources 20 and 22. Examples of suitable drive mechanisms for use in extrusion head 18 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; and Batchelder et al., U.S. Pat. No. 7,896,209.

The received modeling and support materials are then deposited onto build substrate 14 to build printed part 24 and support structure 26 as extruded roads using a layer-based additive manufacturing technique. Support structure 26 is desirably deposited to provide vertical support along the z-axis for overhanging regions of the layers of printed part 24. This allows 3D part 24 to be built with a variety of geometries. After the build operation is complete, the resulting printed part 24/support structure 26 may be removed from build chamber 12. Support structure 26 may then be removed from printed part 24. For example, in embodiments in which the support material is water soluble, the resulting printed part 24/support structure 26 may be placed in a bath containing an aqueous liquid and/or solution (e.g., an aqueous alkaline solution) to remove support structure 26 from printed part 24.

Figure 2:
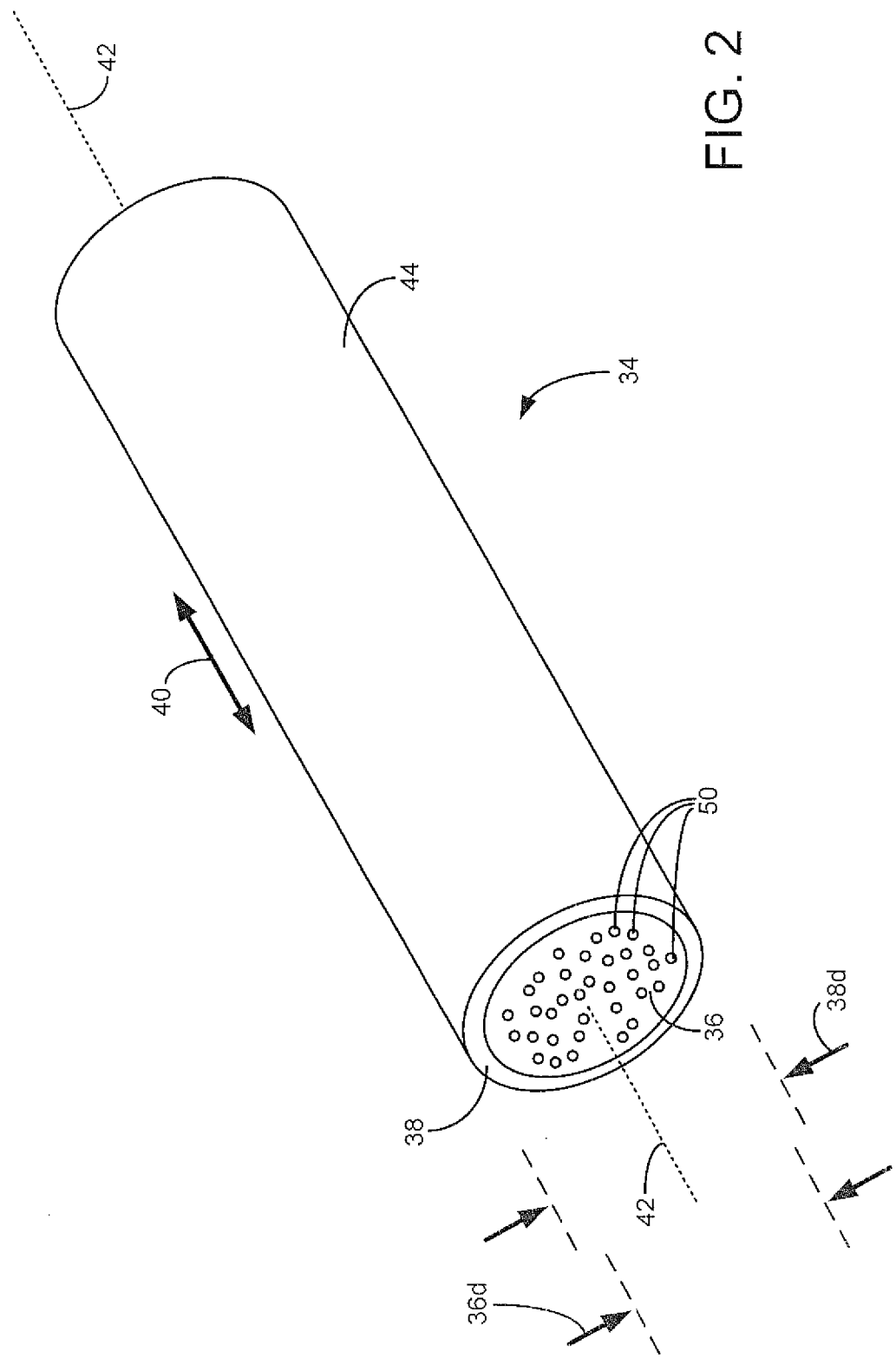
FIG. 2 is a perspective view of a segment of a consumable filament of the present disclosure, where the consumable filament includes a core portion and a shell portion.

FIG. 2 illustrates a segment of filament 34, which is an example of a suitable consumable, composite filament of the present disclosure. As shown, filament 34 includes core portion 36 and shell portion 38, which extend along longitudinal length 40. Core portion 36 is the inner portion of filament 34, located along central axis 42, and shell portion 38 is the outer portion of filament 34, and defines to outer surface 44. Core portion 36 compositionally includes a matrix of a base polymer, particles 50 and optionally, one or more additives. Shell portion 38 compositionally includes a base polymer and optionally, one or more additives. The base polymer of the shell material may be the same as the base polymer of the core material. In some embodiments, the base polymer of the core material may be different than the base polymer of the shell material. Preferably, the core materials and the shell materials are compatible for substantially retaining the particles within the core portion.

The core and shell materials can each include one or more thermoplastic polymers, and optionally, one or more additives. The thermoplastic polymers can be amorphous polymers or semi-crystalline polymers. The core and shell materials, for example, may include additives to modify, for example, the rheology, the glass transition temperature, and the like. Examples of suitable thermoplastic base polymers for use in each of the core and/or shell materials can include acrylonitrile-butadiene-styrene (ABS) copolymers, acrylonitrile styrene acrylate (ASA), styrene-acrylonitrile resin (SAN), polylactic acid (PLA), cyclic olefin copolymer (COC), polyethylene terephthalate (PET-G), polyetheretherketone (PEEK) or polyetherketoneketone (PEKK) family, polycarbonates, polysulfones, polyethersulfones, polyphenylsulfones, polyetherimides, polyamides modified variations thereof (e.g., Nylon-12 copolymers manufactured by Stratasys, Inc. located in Eden Prairie, Minn.), polystyrene, polypropylenes, copolyesters, and blends thereof. Unless indicated otherwise, the base polymers for the core and shell materials are not intended to be limited to these listed polymers.

In another embodiment, the core and shell materials may include thermoplastic polymers derived from the same or similar monomer units, but have different molecular properties, such as different relative molar masses, different molecular weights, different terminal group chemistries, different stereochemistries, and combinations thereof.

In an exemplary embodiment, the core and/or shell materials of the consumable filament include acrylonitrile styrene acrylate (ASA). The core and/or shell materials can include ASA alone or combined with other base polymers. A source ASA filament material is Stratasys, Inc. located in Eden Prairie, Minn. However, the present disclosure is not limited to ASA.

The core portion of the composite filaments described herein can further include particles. Suitable particles can be particles derived from a variety of materials. Inclusion of the particles in the core portion of consumable materials having a core/shell morphology is advantageous due to the protective shell portion (without the particles) substantially encasing the core portion with the particles. The protective shell portion can improve the durability of the filaments, reduce the brittleness of a filament having only the core components and/or reduce the degradation of drives, liquifiers, tubes, liquefier tips and other parts within extrusion head 18 that would contact the particles in a composite filament. The core/shell morphology of the composite filament can be protective against the wear of parts due to the fact the particles are substantially or completely retained in the core portion of the filament and/or without penetrating the outer surface of the shell portion. Therefore, substantially all or all of the particles do not contact the parts of the extruder.

In some embodiments, particles that can be included in the core portion include metallic particles. Metallic particles may be magnetic particles and/or non-magnetic particles. Particles can include metallic, non-magnetic particles, for example, aluminum, copper, gold, silver, stainless steel, titanium, combinations thereof and the like. Particles can also include metallic magnetic particles, for example, iron, cobalt and nickel combinations thereof and the like. Non-metallic particles can also be included in the core material and are also within the scope of this disclosure. Examples of non-metallic particles include particles with thermoplastic polymers having different properties such as melting temperature from the base polymers of the core and the shell. Non-metallic particles can include ceramic particles. Particles can also include moisture absorbing particles, thermally conductive particles, glass bead particles and combinations thereof to aid in processing. The particles may also be organic fill, e.g. cellulose, rice hulls and the like. The particles may have a regular shape such as spheres or cubes or they may have an irregular shape. The core portion of a composite filament may include only one type of particles. Alternatively, the core portion of a composite filament may include two or more types of particles, e.g. ferrite and stainless steel particles. The selection of the particles or filler can be dependent on the application, e.g. tungsten and barium sulfide for radiopaque applications.

In one exemplary embodiment, the particles included in the composite filament are preferably ferrite particles. The ferrite particles, for example, can be combined with the base polymer of the core material. An exemplary filament can include, for example, a core material of a matrix of ASA with ferrite particles as the core. Furthermore, the shell material can also include ASA as the shell. Shell material and core material other than ASA may also be suitable and is within the scope of this disclosure.

The number of particles that can be included in the filament of the consumable material can vary and can be dependent on the end use of the filament and the desired printed part. Particles can be in the core but some particles may also be in the shell. The particles in the filament can be at least about 20 percent by volume of the core portion. Preferably, the particles in the filament are at least about 50 percent by volume of the core portion and more preferably, at least about 55 percent by volume of the core portion. It is contemplated that an upper limit of the volume percent of the particles in the core portion is dictated by the ability to extrude the particles in a matrix that retains as the configuration of the extrudate. Otherwise stated, the upper limit of the volume percent of the particles is limited by the ability of the polymer to retain the particles in the configuration of the extrudate and the interfacial modification chemistries used to coat the particles. The upper limit of the particles may be, for example, about 85 percent by volume of the core portion. Percentage of particles greater than about 85 percent by volume of the core portion are also within the scope of this disclosure.

The size of the particles can vary and can be dependent on the specific particles used, the thickness of the core portion and the shell portion, the desired end use of the filament and the like. Particle size can be limited by the extrusion nozzle inner diameter ID and angle such that particles could not stack or bridge. In some embodiments, the upper limit to particle size may be about one third of the inner extrusion nozzle diameter. In one exemplary embodiment, the size of the particles can be between about 10 microns and about 200 microns.

The core materials and shell materials of a composite filament are selected based on the desired characteristics or properties of the printed part. Utilizing the present core shell filament allows the desired properties to be provided by the core portion while the shell portion aids in transporting the core portion to the extrusion head.

Core portion 36 and shell portion 38, as illustrated in FIG. 2 has a defined interface. In the filaments of the present disclosure, the viscosity of the core portion and the viscosity of the shell portion can be mismatched due to the presence of the particles. This mismatch of the viscosity can occur even when the base polymer of the core portion and the base polymer of the shell portion are the same or substantially similar. Without being bound by any theory, the viscosity between the core portion and the shell portion can be different while maintaining laminar flow of the core/shell materials in the liquefier of an extrusion based additive manufacturing system such as system 10 shown in FIG.1. While core portion 36 and shell portion 38 are illustrated in FIG. 2 as having a defined interface, it is understood that the core and shell materials may partially interdiffuse at this interface during the extrusion process, particularly when the viscosities are the same. Core portions and shell portions having the same or similar viscosities are also within the scope of this disclosure.

Furthermore, the melting temperatures of the core materials (excluding the particles) and shell materials are desirably the same or similar to allow filament 34 to be readily melted in a liquefier of extrusion head 18. As such, the base polymers and optionally any additives of the core material (excluding the particles) and the shell material may be selected to minimize the differences in melting temperatures.

Core portions and shell portions with different melting temperatures are also within the scope of the disclosure. In these embodiments, melting temperatures of the core portion and shell portion are amenable to retaining the particles within the core portion and/or without penetrating the exterior surface of the shell portion when melted in a liquefier of extrusion head 18 of an additive manufacturing system.

In alternative embodiments, the core materials and shell materials may include the same or similar base polymers, but the core material can include one or more additives that can change its characteristics, e.g. rheology, glass transition temperature, $T_g$, melting temperature and the like. Furthermore, the shell material may also include one or more additives to alter its characteristics.

In other alternative embodiments, the core materials and the shell materials can be different. They can, for example, include different base polymers and different additives. In these embodiments, even though the base polymers and/or the additives may be different, the core material and the shell material may still be compatible if the core portion and shell portion can exhibit similar characteristics or properties, e.g. rheological properties, $T_g$ and/or the melting temperature, as described above. For example, the $T_g$ temperature of a base polymer in the core materials can be changed to match or be compatible with the $T_g$ temperature of the shell materials by including additives to the core materials that can change the $T_g$ temperature. Thus, even though the base polymers are different, the materials can be compatible for the core portion and the shell portion of the consumable filaments. Accordingly, the core and shell materials may include a variety of compositional combinations to attain a desired similarity in rheology, $T_g$ temperatures and the like. Incompatible materials could be used together by using a tie-layer of polymer between the core and the shell. A tie layer is a material that is compatible with both of the other polymers that may not be compatible with one another.

Core/shell materials with different characteristics can also be within the scope of the present disclosure as long as the particles are retained within the interior portion of the filament during extrusion of the filament. In addition, core/shell materials are selected such that the particles do not penetrate the outer surface of the shell portion as the filament is melted within the liquefier tube. Furthermore, the particles do not penetrate the outer surface of the shell portion during extrusion and printing a part in a layer by layer manner with an additive manufacturing system.

In addition to the base polymer(s), the core portion and/or the shell portion of the present disclosure may also include additional additives, such as impact modifiers, plasticizers, rheology modifiers, inert fillers, colorants, stabilizers, and combinations thereof. In embodiments that include colorants, preferred concentrations of the colorants in the core and/or the shell materials range from about 0.1% to about 5% by weight. Suitable colorants include titanium dioxide, barium sulfate, carbon black, and iron oxide, and may also include organic dyes and pigments.

In embodiments that include fillers, preferred concentrations of the fillers in the core materials and/or shell materials range from about 1% to about 80% by weight. Suitable fillers include calcium carbonate, magnesium carbonate, glass spheres, graphite, carbon black, carbon fiber, glass fiber, talc, wollastonite, mica, alumina, silica, kaolin, silicon carbide, zirconium tungstate, soluble salts, and combinations thereof.

In embodiments that include plasticizers, preferred concentrations of the plasticizers in the core materials and/or the shell materials range from about 0.5% to about 20% by weight. Suitable additional plasticizers for use in the core materials and/or shell materials include dialkyl phthalates, cycloalkyl phthalates, benzyl and aryl phthalates, alkoxy phthalates, alkyl/aryl phosphates, polyglycol esters, adipate esters, citrate esters, esters of glycerin, and combinations thereof.

In the shown embodiment (FIG. 2), filament 34 has a cylindrical geometry. Core portion 36 has an outer diameter referred to as core diameter 36d, and shell portion 38 has an outer diameter referred to as shell diameter 38d, where shell diameter 38d also corresponds to the outer diameter of filament 34. The relative dimensions for shell diameter 38d to core diameter 36d are desirably selected such that the amount of the shell material that is extruded falls within a balanced range for use in system 10 (shown in FIG. 1).

Filament 34 can have alternative geometries in addition to cylindrical geometries and all are within the scope of this disclosure. Other non-cylindrical geometries include, for example, a ribbon, a tube and other solid and hollow profiles. The cross-sectional geometry of the filament can include, for example, oval, oblong, round, rectangular, triangular, star-shaped, and the like. Filament 34 can be a ribbon filament and have a square or rectangular geometry as shown, for example, in FIG. 3. The filaments may have solid or hollow profiles. The filament, for example, can include a tube or other solid or hollow profiles. The filament can also be, for example, a tube or a cylinder with three or more layers wherein the outer and the inner layers may have same or different materials and include a layer with particles sandwiched between the inner and outer layers. In one exemplary embodiment, the filament includes an A-B-A layer configuration wherein the inner and outer layer include the same material (A) and the middle layer (B) with the material and particles is sandwiched between the two (A) layers. Filaments with other multilayer arrangements and shapes are also within the scope of this disclosure.

The amount of the shell material in filament 34 is desirably high enough such that the extruded roads used to build each layer of printed part 24 (shown in FIG. 1) have sufficient quantities of the shell material (which solidifies upon deposition and cooling in build chamber 12) to keep the particles within the core material and/or encased within the shell material and to resist the pressures exerted on the extruded roads during the formation of subsequent layers of printed part 24. On the other end, the amount of the shell material is desirably low enough to prevent substantial distortions of printed part 24 upon deposition. While not wishing to be bound to theory, it is believed that the difference in density of the core and the shell, the denser core having the particulate has a tendency to sink into and deform the thicker substantially polymeric shell, which can result in distortions of the extruded roads and the printed part.

The amount of the shell material in filament 34 may be determined by dividing the average volume of shell portion 38 from the overall average volume of filament 34 (i.e., the sum of the average volumes of core portion 36 and shell portion 38). The average diameters, cross-sectional areas, and volumes referred to herein are based on average measurements taken for a suitable segment of filament 34 along longitudinal length 40, such as a distance of 6.1 meters (20 feet).

In embodiments in which core diameter 36d and shell diameter 38d are each substantially uniform along longitudinal length 40, measurements of the volumes of shell portion 38 and filament 34 may be simplified to functions of the respective cross-sectional areas. For cylindrical filament 34, the cross-sectional areas for core portion 36, shell portion 38, and filament 34 may be determined based on core diameter 36d and shell diameter 38d.

Examples of suitable average diameters for core diameter 36d range from about 0.76 millimeters (about 0.03 inches) to about 2.5 millimeters (about 0.10 inches). In one embodiment, suitable average diameters for core diameter 36d range from about 1.0 millimeter (about 0.04 inches) to about 1.5 millimeters (about 0.06 inches). Examples of suitable average diameters for shell diameter 38d range from about 1.0 millimeter (about 0.04 inches) to about 3.0 millimeters (about 0.12 inches). In one embodiment, suitable average diameters for shell diameter 38d range from about 1.0 millimeter (about 0.04 inches) to about 1.5 millimeters (about 0.06 inches). In another embodiment, suitable average diameters for shell diameter 38d range from about 1.5 millimeters (about 0.06 inches) to about 2.0 millimeters (about 0.08 inches).

Correspondingly, examples of suitable average cross-sectional areas for core portion 36 range from about 0.5 square millimeters to about 5 square millimeters. In one embodiment, suitable average cross-sectional areas for core portion 36 range from about 0.75 square millimeters to about 2 square millimeters.

Examples of suitable average cross-sectional areas for filament 34 range from about 0.5 square millimeters to about 8 square millimeters. In one embodiment, suitable average cross-sectional areas for filament 34 range from about 1 square millimeter to about 3 square millimeters. In another embodiment, suitable average cross-sectional areas for filament 34 range from about 1 square millimeter to about 2 square millimeters. In yet another embodiment, suitable average cross-sectional areas for filament 34 range from about 2 square millimeters to about 3 square millimeters.

Figure 3:
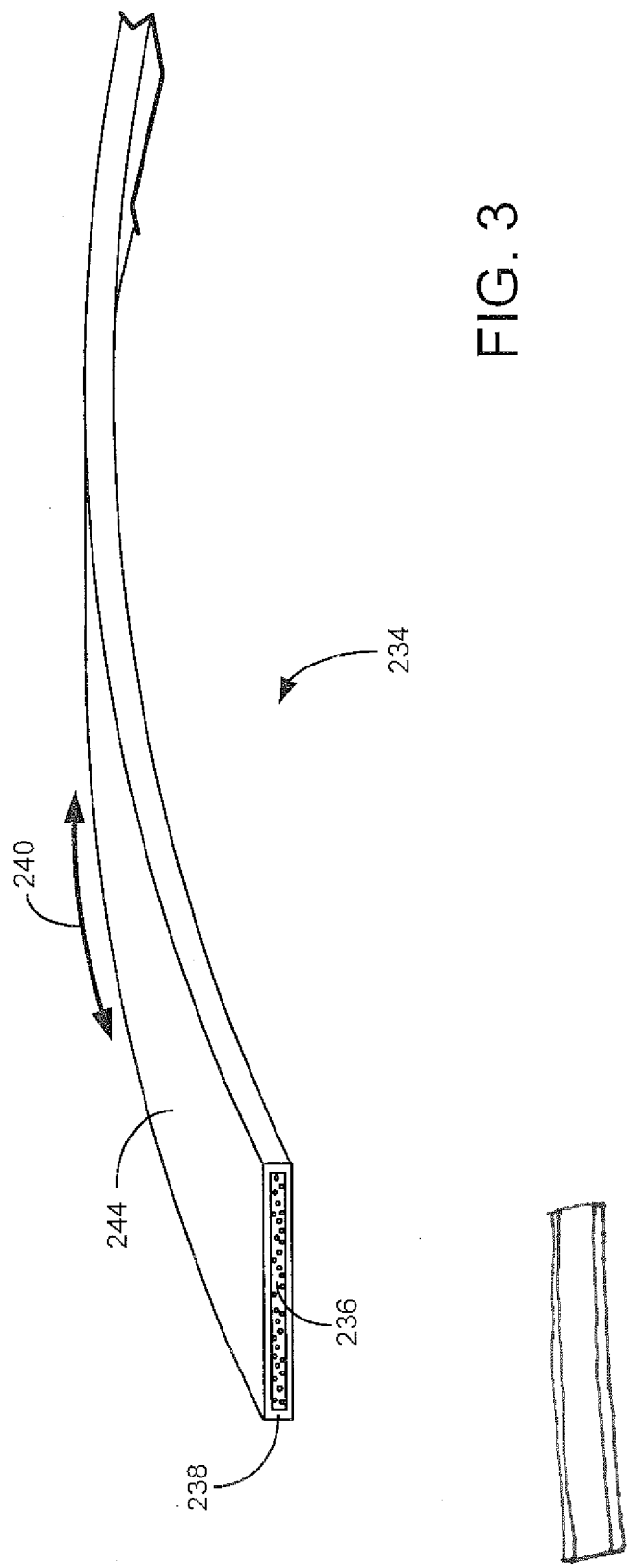
FIG. 3 is a perspective view of a segment of an exemplary consumable filament of the present disclosure, where the exemplary consumable filament includes a rectangular cross-sectional geometry.

The use of cross-sectional areas is also suitable for determining the cross-sectional dimensions of the composite filaments of the preset disclosure that have non-cylindrical geometries (e.g., oval, oblong, round, rectangular, triangular, star-shaped, and the like), as discussed below. FIG. 3 illustrates a composite filament with a rectangular geometry. The cross-sectional areas for composite filaments can vary and depend on the intended use. For example, average cross-sectional areas for a non-cylindrical consumable filament of the present disclosure range from about 0.25 square millimeters to about 10 square millimeters. In some exemplary embodiments, the dimensions of the ribbon filament can be between about 0.25mm to about 1mm in one cross-sectional dimension, and about 1mm to about 10mm in the other cross-sectional dimension. Dimensions outside of these ranges are also within the scope of this disclosure.

Suitable volumes and cross-sectional areas for shell portion 38 may be determined based on these above-discussed suitable cross-sectional areas. Examples of suitable average volumes for shell portion 38 range from about 5% to about 95% of the average volume of filament 34. In one embodiment, suitable average volumes for shell portion 38 range from about 15% to about 65% of the average volume of filament 34. In another embodiment, suitable average volumes for shell portion 38 range from about 25% to about 60% of the average volume of filament 34.

Correspondingly, in embodiments in which core portion 36 and shell portion 38 are each substantially uniform along longitudinal length 40, examples of suitable average cross-sectional areas for shell portion 38 range from about 5% to about 95% of the average cross-sectional area of filament 34. In one embodiment, suitable average cross-sectional areas for shell portion 38 range from about 15% to about 65% of the average cross-sectional area of filament 34. In another embodiment, suitable average cross-sectional areas for shell portion 38 range from about 25% to about 55% of the average cross-sectional area of filament 34.

Figure 4:
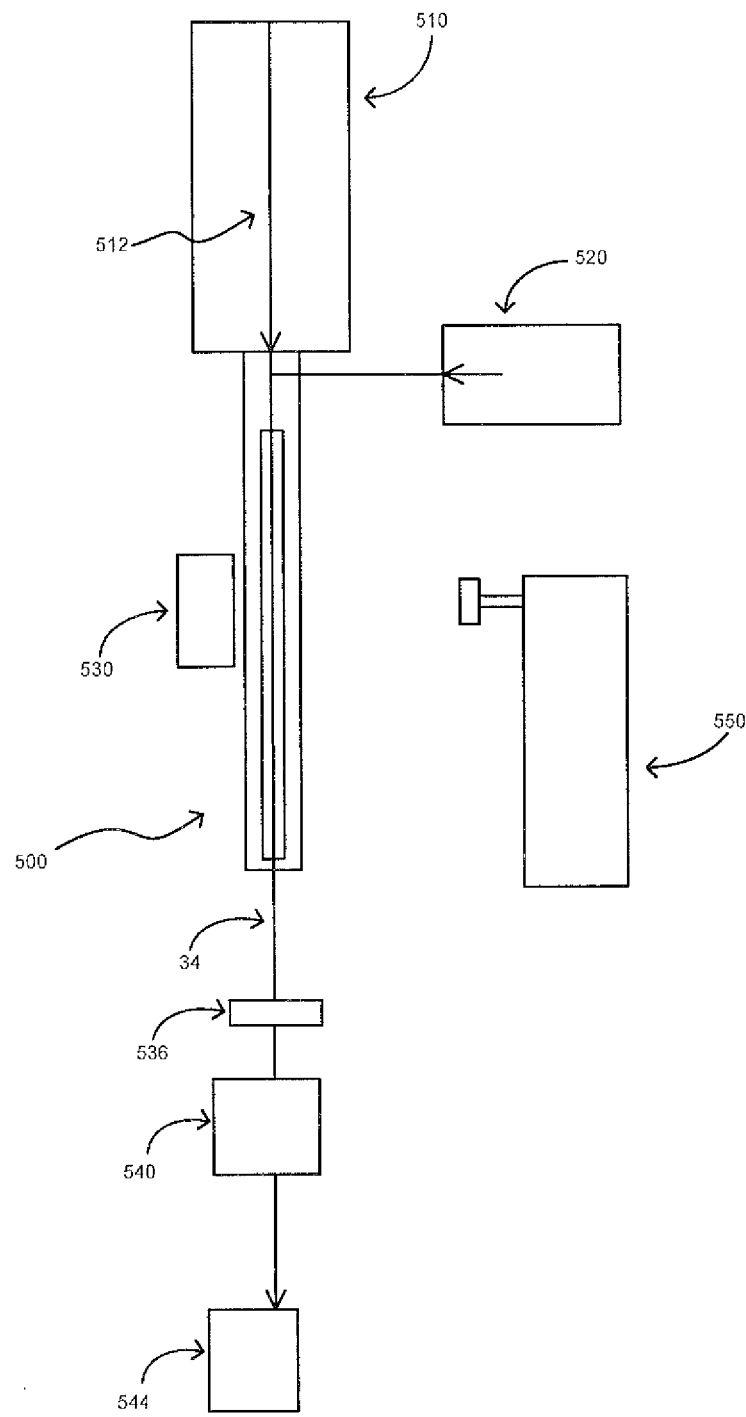
FIG. 4 is a plan view of an exemplary co-extrusion process for manufacturing a consumable filament including a core portion and a shell portion.

Filament 34 may be manufactured with a co-extrusion process, where the core and shell materials may be separately compounded and co-extruded to form filament 34. Other methods for manufacturing filament 34 may also be utilized and all are within the scope of this disclosure. FIG. 4 shows an exemplary embodiment of a co-extrusion process for manufacturing a composite filament described herein. Co-extrusion line 500 includes extruder 510 and extruder 520. An exemplary extruder 510 is a line screw extruder and is used for extruding core portion 36 that includes particles 50. An exemplary extruder 520 is a pressure-limited extruder for extruding shell portion 38. Co-extrusion line 500 includes cooling unit 530 to cool the extrudate. After formation, filament 34 may be packaged for use with system 10 (e.g., within supply source 20). Filament 34, for example, can also be measured by laser micrometer 536 and linked to pulley system 540 to attain spool 544 of consumable composite filament. Co-extrusion line 500 may include coaxial line control panel 550 and floor drain 560.

Figure 5:
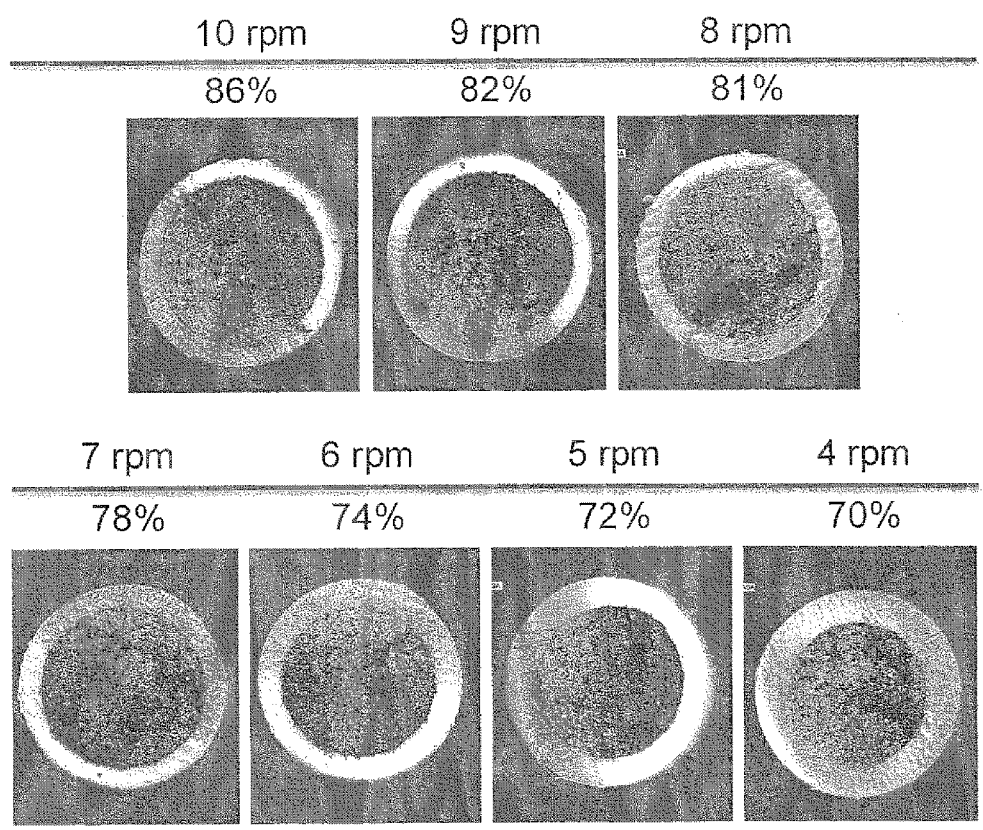
FIG. 5 is a series of photographs of cross-sections of filaments showing the variation of the shell portion with the increase in extrusion speed of the core portion.

In co-extrusion line 500, the rotational speed of the screw within extruder 510 may be varied. Changes in the speed of the screw in extruder 510 can lead to volumetric differences of the core/shell in the filaments. Increasing the speed of the extrusion screw can result in decreasing the volume of the shell portion in the filament. FIG. 5 shows the variation in the cross-sections of filaments produced as the speed of the extrusion screw of the core shell extruder 570 is increased. FIG. 5 shows that the percentage of volume of the core portion in the filament increases as the speed of extrusion screw in extruder 510 increases. In other words, the volume of the shell portion decreases with the increasing speed of the core portion extrusion. In the illustrated example of FIG. 5, the volume of the core portion can change from about 70 percent of the filament at 4 about rpm to about 86 percent of the filament at about 10 rpm.

Figure 6:
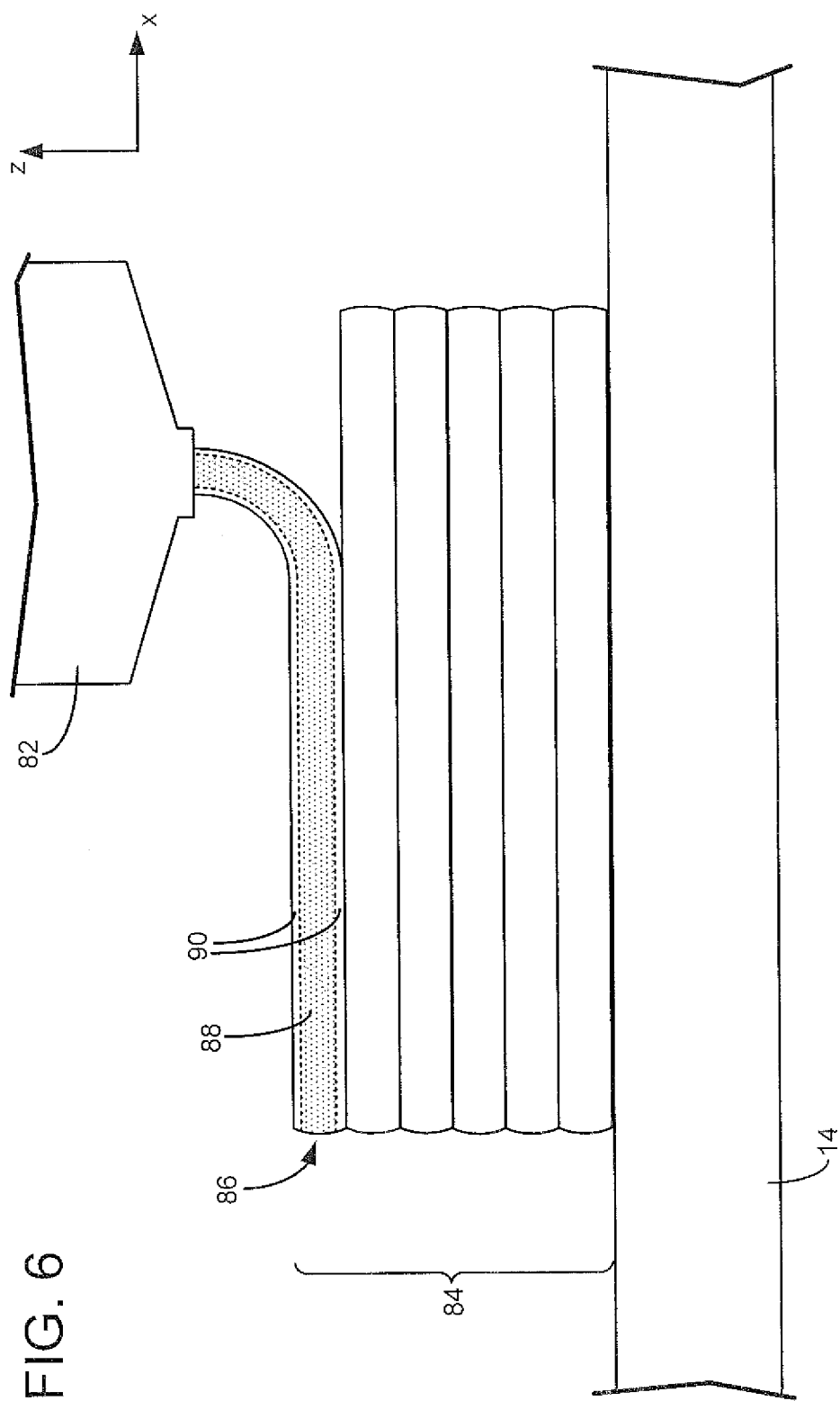
FIG. 6 is a side illustration of layers of a printed part during a build operation, where the dimensions of the layers and the relative distance of an extrusion tip from the layers are exaggerated for ease of discussion.

FIG. 6 illustrates a build operation to build printed part 24 (shown in FIG. 1) from the filament 34 (shown in FIG. 2). As discussed above, during a build operation with system 10 (shown in FIG. 1), filament 34 is fed to extrusion head 18 in a solid state from supply source 20. During feeding of filament 34 to extrusion head 18, the core portion may have breaks but filament 34 can still be utilized and is functional as long as the shell portion is intact. While passing through extrusion head 18, filament 34 is heated in a liquefier to a temperature that is greater than the melting temperatures of the shell and core materials. The molten materials are then deposited onto build substrate 14 or other printed layers from extrusion nozzle 82 of extrusion head 18 in a series of extruded roads to form layers 84 of printed part 24. One or more layers of a support material (not shown) may also be deposited below layers 84 to facilitate the removal of printed part 24 from build substrate 14.

In the shown example, the extruded roads of the core materials and shell materials may at least partially, preferably substantially, retain their core/shell profile from filament 34. For example, top extruded road 86 includes core region 88 of the core material with particles 92 in the core material and shell region 90 of the shell material, where shell region 90 may extend around and encase core region 88. In one embodiment, at least a portion of the extruded road partially retains the core/shell cross-sectional profile from filament 34. In a further embodiment, the extruded roads substantially retain their core/shell cross-sectional profile from filament 34.

While not wishing to be bound by theory, it is believed that a substantially laminar flow of the molten core and shell materials through a liquefier of extrusion head 18 may allow the extruded roads (e.g., road 86) to at least partially retain their core/shell profile. This laminar flow can be maintained, for example, when the viscosity of the core and shell materials is mismatched. It is understood that interdiffusion of the molten core and shell materials may occur at the interface between core region 88 and shell region 90, particularly when the viscosities of the core and the shell materials are similar or matched. As such, the resulting extruded roads (e.g., road 86) may exhibit a cross-sectional profile that is the same or substantially similar to that of filament 34 (as shown in FIG. 2), may exhibit a blend of the core and shell materials, or may exhibit a cross-sectional profile that is a variation between these two profiles (e.g., a profile in which the core and shell materials are partially interdiffused).

It is understood that the extruded roads (e.g., road 86) are typically flattened during the build operation due an ironing effect from extrusion tip 82 caused by pressure between a distal end of the extrusion tip and the previously deposited layer. As such, having a cross-sectional profile that is the same or substantially similar to that of the filament does not necessarily mean that the cross-sectional shapes are the same (e.g., both are circular). Rather, this phrase means that the core material remains encased (or at least partially encased) in the shell material and the particles of the core material do not penetrate the outer surface of the shell portion.

As discussed above, build chamber 12 is desirably heated to one or more suitable temperatures to allow the extruded roads to solidify in one or more stages. In one embodiment, the envelope of build chamber 12 may optionally be heated and maintained at one or more temperatures that are about equal to, or within a small range above or below, the solidification temperature of the shell and/or the core material. Upon being deposited into build chamber 12, the molten core and shell materials of road 86 cool from the elevated liquefier temperature within extrusion head 18 to the temperature(s) of build chamber 12. This desirably cools road 86 so that the shell and/or core material can solidify. The shell material desirably solidifies in less time than is required to build a single layer of printed part 24, such that the shell material exhibits at least about 30% solidification prior to the deposition of a subsequent layer, and more desirably at least about 50% solidification. While a heated chamber is discussed, the present core/shell filament can be utilized in an additive manufacturing system without a heated chamber or in an out of oven system. Some particles or filler types may lend themselves to no chamber or active cooling due to the increased heat capacity of the matrix.

In an alternative embodiment, the envelope of build chamber 12 may be maintained at one or more temperatures that define a temperature gradient that decreases in a downward direction along the vertical z-axis. For example, the upper region of build chamber 12 may be heated and maintained at one or more temperatures that are about equal to, or within a small range above or below, the Tg temperature of the core and/or shell material. The lower region of build chamber 12, however, may be maintained at one or more lower temperatures. For example, the lower region of build chamber 12 may be heated and maintained at one or more temperatures that are about equal to, or within a small range above or below, the solidification temperature of the core and/or shell material. As build substrate 14 lowers downward in an incremental manner along the vertical z-axis, the gradual or stepwise cooling may allow the core and/or shell material to slowly harden over time as subsequent layers are built.

Figure 7:
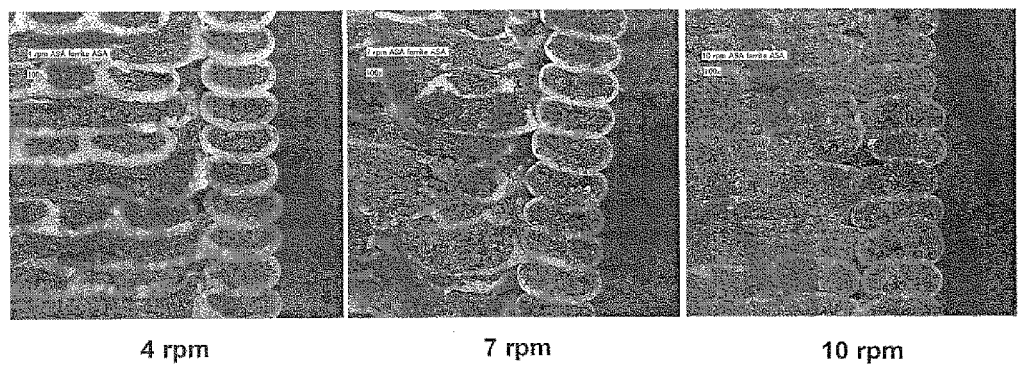
FIG. 7 is a series of photographs of a cross-section of a printed part using a filament with a core portion and a shell portion of the present disclosure with variation of a thickness of the shell portion.

The composite filaments described herein can be used in a method of printing 3D parts. The composite filament can be provided, for example, in consumable assemblies in a variety of forms for use in an additive manufacturing system. The filament can be provided, for example, to system 10 having print head 18 within consumable assembly 22. System 10 may operate with preset instructions for extruding melt 70 at desired flow rates based on tool path geometries. These preset instructions are preferably based on the thermal properties of the consumable material, namely the melting rate and viscosity of the composite filament. The method includes printing the part in a layer by layer manner utilizing an additive manufacturing system. FIG. 7 shows a series of photographs of a cross-section of a printed part built using a composite filament described herein. The cross-section of the printed part can be seen to maintain the core/shell cross-sectional profile of the composite filament within the printed part.

If the printed parts require support structures, any suitable support materials may be used in conjunction with the consumable assemblies described herein. The support materials selected can be dependent on the properties of the composite filaments.

Additionally, the core portions of the composite filaments may vary from the embodiments discussed above for filament 34. For example, in some embodiments, the core portions (e.g., core portion 36) may be located off-axis from the central axis of the composite filament. In additional alternative embodiments, the geometries of the core portions may be non-cylindrical (e.g., oval, oblong, round, rectangular, triangular, and the like) and/or hollow to modify the characteristics of the resulting extruded roads. For example, as shown in FIG. 3, filament 234 is similar to filament 34 (shown in FIG. 2), where the respective reference labels are increased by "200". As shown in FIG. 3, filament 234 includes a non-cylindrical cross-sectional geometry with core portion 236 and shell portion 238 each having a rectangular cross-sectional geometry. Examples of suitable materials for core portion 236 and shell portion 238 include those discussed above for core portion 36 and shell portion 38 (shown in FIG. 2).

Suitable cross-sectional areas include those discussed above. For example, suitable average cross-sectional areas for core portion 236 range from about 0.25 square millimeters to about 0.75 square millimeters. Correspondingly, examples of suitable average cross-sectional areas for filament 234 range from about 0.5 square millimeters to about 1.5 square millimeters.

Filaments 34, and 234, shown above, illustrate suitable consumable materials of the present disclosure that compositionally include same or substantially similar polymeric materials. In additional embodiments of the present disclosure, the consumable materials may compositionally include core and shell materials with different polymeric materials that impart different properties. In these embodiments, the consumable materials may be used as modeling materials to build printed parts (e.g., printed part 24), as support materials to build support structures (e.g., support structure 26), or both, where the different material properties may assist in the build operations with extrusion-based additive manufacturing systems, such as system 10.

The consumable materials of the present disclosure may include a variety of different core and shell materials. This allows the modeling materials and/or the support materials to be designed for compatibility with each other and for use in extrusion-based additive manufacturing systems, thereby increasing the range of suitable materials for building printed parts and support structures.

EXAMPLES

The present disclosure is more particularly described in the following examples that are intended as illustrations only, since numerous modifications and variations within the scope of the present disclosure will be apparent to those skilled in the art. Unless otherwise e and all reagents used in the examples were obtained, or are available, from the chemical suppliers described below, or may be synthesized by conventional techniques.

Example 1

Consumable filaments were coextruded in a core and shell arrangement corresponding to filament 34 (shown in FIG. 2). The core material of the core portion included ASA commercially available from A. Shulman, Fairlawn, Ohio. The particles were coated with an interfacial modifier chemistry to aid in incorporation into the polymer. The core material also includes ferrite particles purchased from Sigma Aldrich Corp., St. Louis, Mo. The ferrite particles purchased from Sigma Aldrich Corp., St. Louis, Mo. were added at about 55% by volume of the core material. The shell material was also ASA and the same material as used for the core material. The shell material may be dyed with a white colorant to visibily distinguish the core portion from the shell portion.

FIG. 5 includes photographs of cross-sectional segments of the composite filaments. The shell portions of the composite filaments are shown with lighter shade due to the colorant dyes. The core portions of the filaments with the ferrite particles are shown with darker shades. The filaments were coextruded with varying feed rates of the core portion to vary the volume fractions for the shell portions. The filament shown in FIG. 5 had an average core portion volume fraction that varied from about 70% at about 4 rpm to about 86% at about 8 rpm. The rpm of the extrusion of the core portion was varied.

Example 2

Cross section of filaments of Example 1 were then used to build printed parts. FIG. 7 is a photograph of printed parts built with the exemplary filaments. The printed part shown in FIG. 7 was a bar. Each printed part was built in an extrusion-based additive manufacturing system commercially available from Stratasys, Inc., Eden Prairie, MN under the trade designation "FDM TITAN". The filaments were melted in an extrusion head liquefier of the system at a set temperature range of 260° C. to 300° C., which was greater than the melting temperatures of the core and shell materials.

The molten materials were then extruded and deposited into a build environment envelope maintained at a temperature range of about 160° C. to 180° C.

The printed part had a lighter shell color and a darker core portion color with the particles. This shows that the extruded roads of the molten materials retained a core/shell cross-sectional profile. Furthermore, printed parts built with different volumes of shell portion maintain the cross-sectional profile of the filament. As the shell decreased in volume, (extrusion speed of core portion during filament formation from 4 rpm to 7 rpm), the cross-sectional profile of the filament is maintained indicative that laminar flow was not substantially disrupted.

Although the present disclosure has been described with reference to several embodiments, workers skilled in the art will recognize that changes may be made in form and detail without departing from the spirit and scope of the disclosure.

The invention claimed is:

1. A consumable filament for use in an additive manufacturing system, the consumable filament comprising:
   a core portion extending along a longitudinal length of the consumable filament, the core portion compositionally comprising a matrix of a first base polymer and particles dispersed in the matrix; and
   a shell portion extending along the longitudinal length of the consumable filament and at least partially encasing the core portion, the shell portion compositionally comprising a second base polymer, wherein the consumable filament is configured to be melted and extruded in an additive manufacturing system.

2. The consumable filament of claim 1, wherein the first base polymer and the second base polymer are the same.

3. The consumable filament of claim 1, wherein the first base polymer and the second base polymer are different.

4. The consumable filament of claim 1, wherein a glass transition temperature of the first base polymer and the second base polymer are substantially similar.

5. The consumable filament of claim 1, wherein a rheology of the first base polymer and the second base polymer are substantially similar.

6. The consumable filament of claim 1, wherein a viscosity of the core portion is different than the viscosity of the shell portion and wherein the filament displays laminar flow when melted.

7. The consumable filament of claim 1, wherein the particles are selected from metallic particles, non-metallic particles, magnetic particles and combinations thereof.

8. The consumable filament of claim 1, wherein the particles are ferrite particles.

9. The consumable filament of claim 1, wherein the filament has a geometry selected from a cylinder, a ribbon, a tube and other filled or hollow profiles.

10. The consumable filament of claim 1, wherein the shell portion comprises Acrylonitrile Styrene Acrylate (ASA) and the core portion comprises ASA-ferrite.

11. A printed part built with an extrusion-based additive manufacturing system, the printed part comprising:
    a plurality of solidified layers each comprising roads extruded with the extrusion-based additive manufacturing system from a consumable filament having a core portion and a shell portion, wherein the core portion compositionally comprises a matrix of a first base polymer and particles dispersed within the matrix, and wherein the shell portion comprises a second base polymer; and
    wherein the plurality of solidified layers retain the particles substantially within the core portion of the consumable filament and at least partially retain the cross-sectional profiles corresponding to the core portion and the shell portion of the consumable filament.

12. The printed part of claim 11, wherein the first base polymer and the second base polymer are the same.

13. The printed part of claim 11, wherein the first base polymer and the second base polymer are different.

14. The printed part of claim 11, wherein a glass transition temperature of the first base polymer and the second base polymer are substantially similar.

15. The printed part of claim 11, wherein a rheology of the first base polymer and the second base polymer are substantially similar.

16. The printed part of claim 11, wherein a viscosity of the core portion is different than a viscosity of the shell portion and wherein the filament displays laminar flow when melted.

17. The printed part of claim 11, wherein the particles are selected from metallic particles, non-metallic particles, magnetic particles and combinations thereof.

18. The printed part of claim 11, wherein the particles are ferrite particles.

19. The printed part of claim 11, wherein the core portion and/or the shell portion comprises Acrylonitrile Styrene Acrylate (ASA).

20. The printed part of claim 11, wherein the core portion comprises ASA-ferrite matrix and the shell portion comprises ASA.

* * * * *